(12) United States Patent
Paredes Cabrera

(10) Patent No.: US 9,743,314 B2
(45) Date of Patent: *Aug. 22, 2017

(54) COMMUNICATION NETWORK CONGESTION CONTROL USING ALLOCATION AND RETENTION PRIORITY

(71) Applicant: Telefonaktiebolaget LM Ericsson (publ), Stockholm (SE)

(72) Inventor: Ricardo Paredes Cabrera, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,151

(22) Filed: Feb. 9, 2015

(65) Prior Publication Data

US 2015/0156668 A1    Jun. 4, 2015

Related U.S. Application Data

(63) Continuation of application No. 13/492,542, filed on Jun. 8, 2012.

(51) Int. Cl.
*H04J 3/14* (2006.01)
*H04L 1/00* (2006.01)
(Continued)

(52) U.S. Cl.
CPC ....... *H04W 28/0289* (2013.01); *H04L 47/245* (2013.01); *H04L 47/29* (2013.01);
(Continued)

(58) Field of Classification Search
None
See application file for complete search history.

(56) References Cited

U.S. PATENT DOCUMENTS 7,668,090 B1 *   2/2010   Charny .................. 370/230
8,000,235 B2     8/2011   Noy et al.
(Continued)

FOREIGN PATENT DOCUMENTS

EP    1 478 133 A2    11/2004

OTHER PUBLICATIONS

International Search Report and Written Opinion dated Oct. 30, 2013 for International Application No. PCT/IB2013/054195, International Filing Date: May 21, 2013 consisting of 13-pages.
(Continued)

*Primary Examiner* — Chi H Pham
*Assistant Examiner* — Soon-Dong D Hyun
(74) *Attorney, Agent, or Firm* — Christopher & Weisberg, P.A.

(57) ABSTRACT

A method for managing congestion on a communication network that includes a network node having a congestion level. Congestion pre-emption criteria corresponding to the congestion level is determined. A list of potential service pre-emption candidates associated with a service pre-emption criteria that is at least equal to the congestion pre-emption criteria is created. The list of potential service pre-emption candidates is at least a sub-set of a plurality of services on the node. A determination is made as to whether to pre-empt at least one of the potential service pre-emption candidates on the list based at least on the service pre-emption criteria.

23 Claims, 5 Drawing Sheets

(51) Int. Cl.
 H04W 28/02 (2009.01)
 H04L 12/851 (2013.01)
 H04L 12/801 (2013.01)
 H04W 76/06 (2009.01)
(52) U.S. Cl.
 CPC ..... *H04W 28/0284* (2013.01); *H04W 76/064* (2013.01); *H04W 28/0268* (2013.01)

(56) References Cited

U.S. PATENT DOCUMENTS

| | | | | |
|---|---|---|---|---|
| 8,787,159 | B2* | 7/2014 | Barclay | H04W 28/0247 370/229 |
| 2006/0067213 | A1* | 3/2006 | Evans et al. | 370/229 |
| 2006/0072522 | A1 | 4/2006 | Chandra et al. | |
| 2008/0130502 | A1* | 6/2008 | Charny et al. | 370/235 |
| 2010/0011118 | A1* | 1/2010 | Chang et al. | 709/235 |
| 2010/0017846 | A1 | 1/2010 | Huang et al. | |
| 2011/0170414 | A1 | 7/2011 | Lee et al. | |
| 2011/0222406 | A1 | 9/2011 | Persson et al. | |
| 2011/0261695 | A1 | 10/2011 | Zhao et al. | |
| 2012/0155282 | A1* | 6/2012 | Dorenbosch | H04W 72/005 370/241.1 |
| 2012/0250509 | A1* | 10/2012 | Leung et al. | 370/235 |
| 2012/0307631 | A1* | 12/2012 | Yang et al. | 370/230 |
| 2013/0114408 | A1* | 5/2013 | Sastry | H04W 28/02 370/231 |
| 2013/0136036 | A1* | 5/2013 | Chen | H04W 28/24 370/260 |
| 2013/0223222 | A1* | 8/2013 | Kotecha et al. | 370/235 |

OTHER PUBLICATIONS

Alcatel-Lucent Technologies, The LTE Network Architecture, A comprehensive tutorial, Strategic White Pages consisting of 26-pages.

3GPP TS 23.203 V11.3.0 (Sep. 2011), "3rd Generation Partnership Project; Technical Specification Group Services and System Aspects; Policy and charging control architecture, (Release 11)" consisting of 167 pages.

3GPP TS 23.203 V11.5.0 (Mar. 2012), "3rd Generation Partnership Project; Technical Specification Group Services and System Aspects; Policy and charging control architecture, (Release 11)" consisting of 175 pages.

3GPP TS 23.401 V11.1.0 (Mar. 2012), "3rd Generation Partnership Project; Technical Specification Group Services and System Aspects; General Packet Radio Service (GPRS) enhancements for Evolved Universal Terrestrial Radio Access Network (E-UTRAN) access, (Release 11)" consisting of 284 pages.

3GPP TS 23.401 V10.5.0 (Sep. 2011), "3rd Generation Partnership Project; Technical Specification Group Services and System Aspects; General Packet Radio Service (GPRS) enhancements for Evolved Universal Terrestrial Radio Access Network (E-UTRAN) access, (Release 10)" consisting of 282 pages.

PCT Notification Concerning Transmittal of International Preliminary Report on Patentability, Form PCT/IPEA/416, dated Sep. 22, 2014 for corresponding International Applicatino No. PCT/IB2013/054195; International Filing Date: May 21, 2013 consisting of 32-pages.

* cited by examiner

COMMUNICATION NETWORK CONGESTION CONTROL USING ALLOCATION AND RETENTION PRIORITY

CROSS-REFERENCE TO RELATED APPLICATION

This application is a continuation of U.S. patent application Ser. No. 13/492,542, filed Jun. 8, 2012, the entirety of which is incorporated herein by reference.

TECHNICAL FIELD

Network communications, and in particular to a method and system for managing congestion on a communication network.

BACKGROUND

Various congestion control mechanisms are used to prevent network congestion. Network congestion may occur when the network is subjected to more traffic than the network is designed to handle. For example, processing large amounts of data may compromise the quality of service ("QoS") of the network. In packet-switched networks, packets move in and out of node buffers and queues as the packets traverse the network. During periods of excessive traffic, hundreds, thousands or even millions of packets may arrive at a node from one or more sources, which may affect the ability of the node to process new incoming packets. Typical effects may include queuing delay, packet loss, the blocking of new connections and/or termination of existing services.

Congestion control techniques include preventing multiple sources from simultaneously sending data to a node. For example, a node may be able to detect that congestion is about to occur on the node, and may attempt to slow down the multiple sources sending data to the node before the queues of the node become congested. While, this approach may temporarily delay the congestion on the node, it does not avoid the congestion. Other mechanisms of congestion control include blocking all traffic that is in excess of the network's capacity and dropping packets from overloaded queues. However, this may cause the sender to retransmit the packets, which may contribute to keeping the network congested by increasing traffic on the network.

Some networks use admission control to deal with congestion on the network. Admission controls limit the number of connections on a node by accepting or rejecting service requests. Nevertheless, admission control is limited, given that it may be difficult for the admission control algorithm to predict future levels of resource utilization at the time the services are admitted.

Therefore, in view of the different congestion control techniques described above, it is still desirable to have a technique for managing network congestion that addresses the shortcomings of known solutions.

SUMMARY

The present invention provides a congestion management method and system for managing congestion on a communication network. The communication network includes a network node having a congestion level. The system includes a congestion controller. The congestion controller determines congestion pre-emption criteria corresponding to the congestion level. The congestion controller creates a list of potential service pre-emption candidates. The potential service pre-emption candidates are associated with a service pre-emption criteria that is at least equal to the congestion pre-emption criteria. The list of potential service pre-emption candidates is at least a sub-set of the multiple services on the node. The congestion controller determines, based at least on the service pre-emption criteria, whether to pre-empt at least one of the potential service pre-emption candidates on the list.

In accordance with another aspect, a method for managing congestion on a communication network is provided. The communication network includes a network node having a congestion level. Pre-emption criteria corresponding to the congestion level is determined. A list of potential service pre-emption candidates associated with a service pre-emption criteria that is at least equal to the congestion pre-emption criteria is created. The list of potential service pre-emption candidates is at least a sub-set of the multiple services on the node. A determination is made, based at least on the service pre-emption criteria, on whether to pre-empt at least one of the potential service pre-emption candidates on the list.

In accordance with yet another aspect, another method for managing congestion on a communication network is provided. The communication network includes a network node having a congestion level. A predetermined pre-emption threshold corresponding to the congestion level is determined. A service characteristic associated with a service on the node is determined. The predetermined pre-emption threshold is compared to the service characteristic. A determination is made whether to pre-empt the service based at least on the comparison.

In accordance with yet another aspect, a computer readable storage medium storing computer readable instructions is provided that when executed by a processor, cause the processor to determine pre-emption criteria corresponding to the congestion level. The processor creates a list of potential service pre-emption candidates associated with a service pre-emption criteria that is at least equal to the congestion pre-emption criteria. The list of potential service pre-emption candidates is at least a sub-set of the multiple services on the node. The processor makes a determination, based at least on the service pre-emption criteria, as to whether to pre-empt at least one of the potential service pre-emption candidates on the list.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

Figure 1:
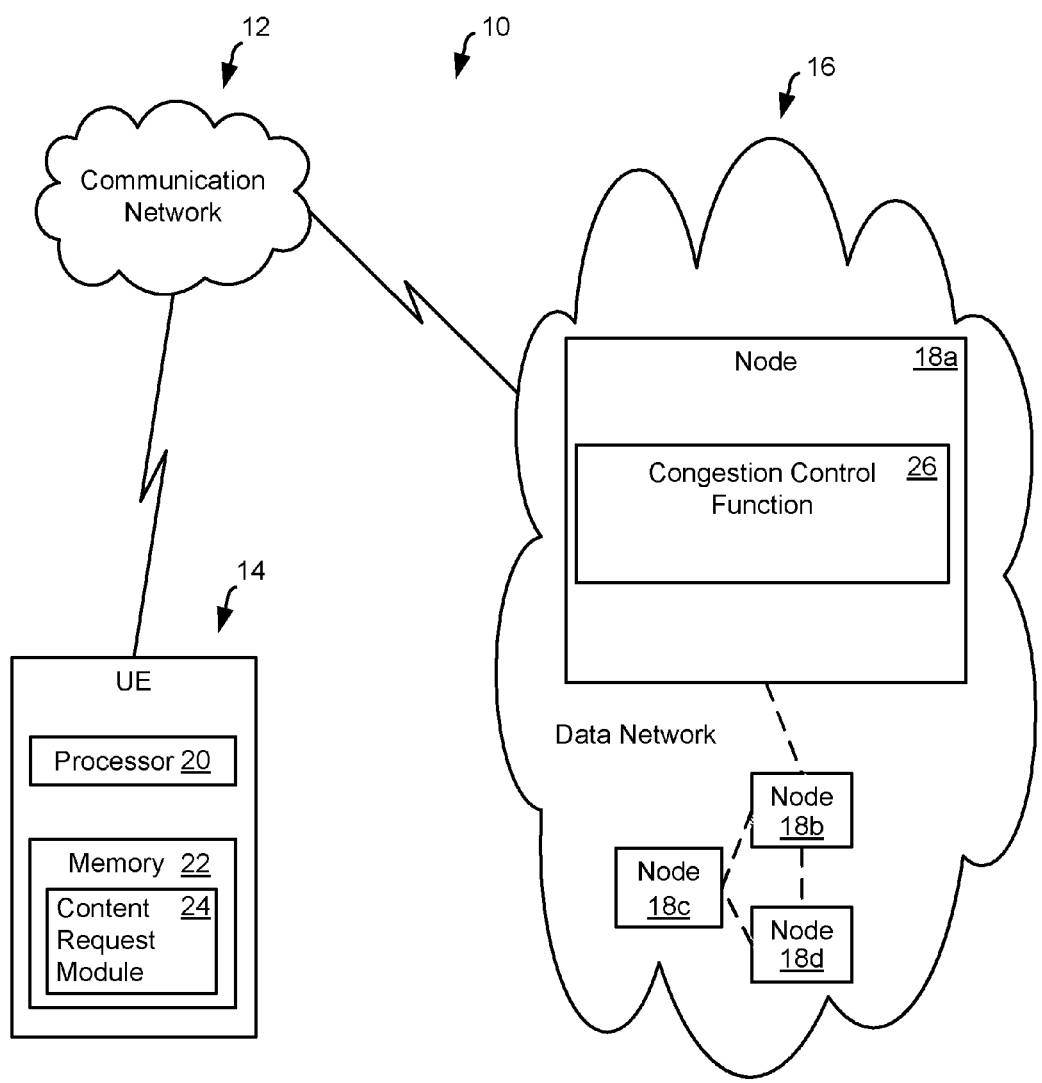
FIG. 1 is a block diagram of an exemplary communication network, constructed in accordance with the principles of the present invention.

Embodiments of the present invention provide a method and system for managing congestion on a communication network, the communication network including a node. In accordance with an embodiment, a congestion controller determines congestion pre-emption criteria corresponding to the congestion level. The congestion controller creates a list of potential service pre-emption candidates. The potential service pre-emption candidates are associated with service pre-emption criteria that is at least equal to the congestion pre-emption criteria. The list of potential service pre-emption candidates is at least a sub-set of a plurality of services on the node. The congestion controller determines based at least on the service pre-emption criteria, whether to pre-empt at least one of the potential service pre-emption candidates on the list.

Before describing in detail exemplary embodiments that are in accordance with the present invention, it is noted that the embodiments reside primarily in combinations of apparatus components and processing steps related to managing congestion on a communication network. Accordingly, the system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures, in which like reference designators denote like elements, there is shown in FIG. 1 a schematic illustration of an exemplary system in accordance with the principles of the present invention, and generally designated as "10." System 10 includes communication network 12, user equipment ("UE") 14 and data network 16. Data network may be a packet data network ("PDN"). Data network 16 may include communication nodes 18a, 18b, 18c and 18d. Each one of nodes 18a, 18b, 18c and 18d is referred to herein as node 18. Although only nodes 18a-18d are shown, the invention is not limited to such. Data network 16 may include any number of nodes. UE 14 may include processor 20, memory 22 and content request module 24. UE 14 communicates with data network 16 via communication network 12. A bearer, i.e., a packet flow or tunnel, may be used by a service to transmit data between UE 14 and node 18.

In an exemplary embodiment, node 18 may experience congestion due to a large amount of services being processed. The congestion level of node 18 may cause the communication flow with UE 14 to experience delays. In order to relieve the congestion on node 18, at least one service being processed by node 18 may be pre-empted. Node 18 includes congestion control function 26 for managing congestion. In an exemplary embodiment, the congestion level of node 18 may be associated with congestion pre-emption criteria. The congestion pre-emption criteria corresponding to the congestion level of node 18 is determined. A list of potential service pre-emption candidates associated with a service pre-emption criteria that is at least equal to the congestion pre-emption criteria may be created. The list of potential service pre-emption candidates may be at least a sub-set of the services on node 18.

UE 14 may include, in addition to processor 20, memory 22 and content request module 24, other hardware and software components, such as a communication interface, a display, etc. Processor 20 may include a central processing unit ("CPU") for performing the functions described herein with respect to UE 14. Memory 22 may include random access memory ("RAM") and read only memory ("ROM"). Computer programs (also called computer control logic) may be stored in memory 22. For example, computer programs are stored on memory 22 for execution by processor 20. In particular, the computer programs, when executed, enable processor 20 to perform the functions described herein. Accordingly, such computer programs represent controllers of the corresponding device. Content request module 24 may request services from data network 16 via communication network 12.

Communication network 12 may include a cellular communication network and the Public Switched Telephone Network ("PSTN"), or other wide area network ("WAN"), such as the Internet, as well as local area networks ("LANs"), such as an Ethernet LAN and a Long Term Evolution ("LTE") network. Communication network 12 may be a wireless network, such as Wi-Fi, satellite, infrared, Bluetooth, Near Field Communications, or other communications network. UE 14 and node 18 may be connected via communication network 12 to other computers (not shown).

Data network 16 may include an interconnected set of network nodes, such as nodes 18a-18d. Data network 16 may be a packet-switched network, such as a TCP/IP network in which data network 16 provides services to UE 14. UE 14 may connect to node 18 in order to send and receive packets from data network 16. Data network 16 may implement path redundancy by using multiple paths to transmit data. Data network 16 may transmit packets using header information in the packet, which may include a destination address. Node 18 may read the destination address and forward packets accordingly. Data network 16 may route IP traffic to and from UE 14 using a bearer connecting UE 14 and node 18.

Node 18 may be any computing device that may receive and forward data, such as a computer, a router, a server, etc. Node 18 may support different classes of service bearers, including but not limited to a radio bearer that may carry information on a radio interface, an Si bearer that may carry information between node 18 and one of a Serving Gateway ("SGW") or a Mobility Management Entity ("MME"), and an Evolved Packet System ("EPS") bearer that may provide data network 16 connectivity service to UE 14. An EPS bearer may be a default or a dedicated EPS bearer established after the default EPS bearer has been established with data network 16. An EPS bearer may connect an MME and an SGW or an SGW and a PDN Gateway ("PGW"). An EPS bearer can be either a Guaranteed Bit Rate ("GBR") or a non-GBR.

Bearers may be associated with bearer level QoS parameters, such as a QoS Class Identifier ("QCI") and Allocation and Retention Priority ("ARP"). The QCI parameter dictates the preferential treatment that packets for a bearer receive, while the ARP parameter dictates the preferential treatment a bearer receives when they are being established. Multiple bearers may be established for UE 14 in order to provide different QoS connectivity. For example, a VoIP bearer may provide a different QoS for the voice call than a bearer carrying web browsing data. Node 18 may be connected to a default bearer and/or a dedicated bearer associated with a particular QoS value.

Figure 2:
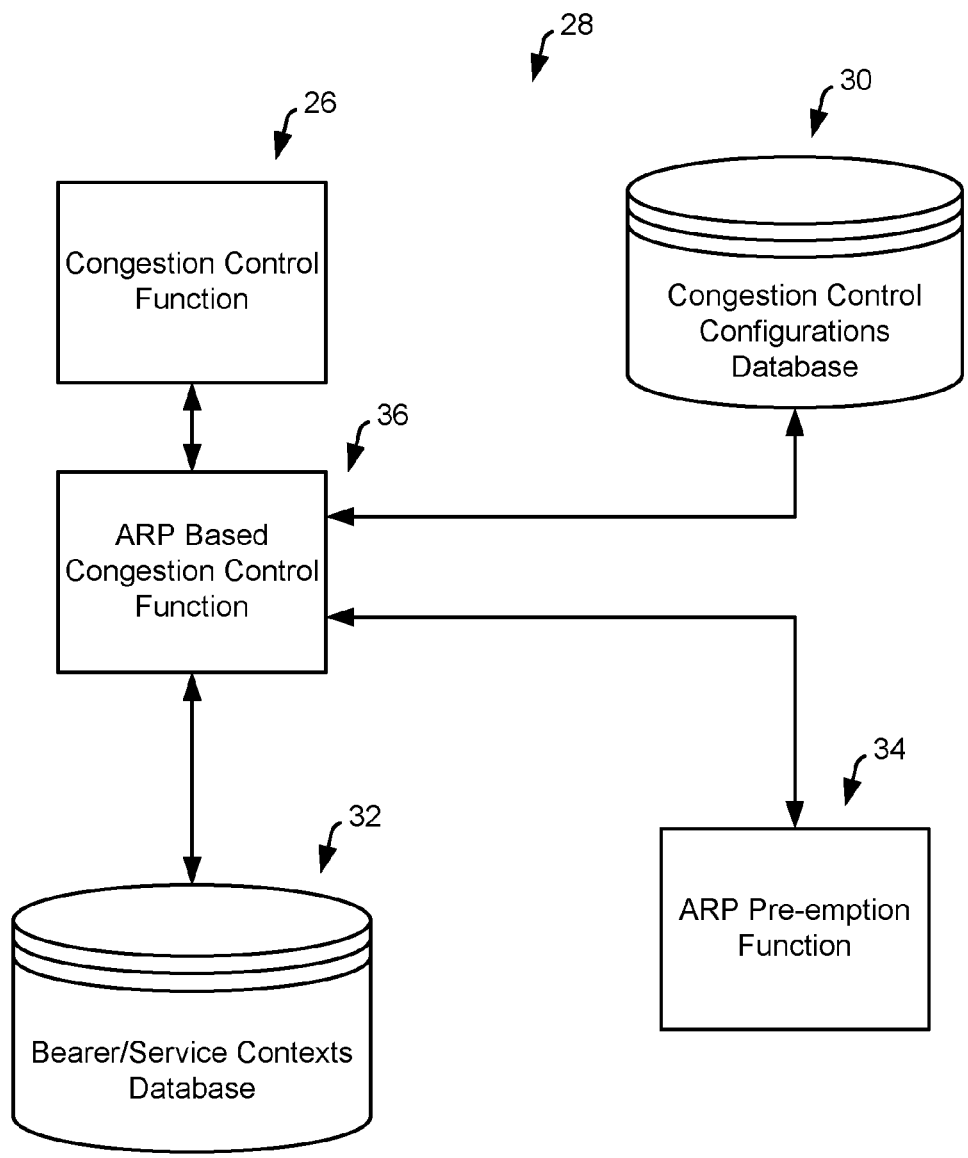
FIG. 2 is a block diagram of an exemplary congestion management system for managing congestion, constructed in accordance with the principles of the present invention.

FIG. 2 is a block diagram of an exemplary congestion management system 28 for managing congestion constructed in accordance with the principles of the present invention. Congestion management system 28 may include congestion control function 26, congestion control configurations database 30, service contexts database 32 and pre-emption function 34 in communication with each other. Congestion control function 26 may include or may be in communication with an ARP based congestion control function 36.

Congestion control function 26 determines a level of congestion on node 18. Congestion control function 26 may request congestion pre-emption criteria corresponding to the congestion level on node 18 from congestion control configurations database 30. Congestion control function 26 may obtain from service contexts database 32 a list of services associated with service pre-emption criteria corresponding to the congestion pre-emption criteria. Congestion control function 26 may choose at least one service to pre-empt from the list, and may use pre-emption function 34 to pre-empt the service. Pre-emption function 34 may be an ARP pre-emption function.

In an exemplary embodiment, node 18 may include at least one of congestion control function 26, congestion control configurations database 30, service contexts database 32, pre-emption function 34 and ARP based congestion control function 36. In another exemplary embodiment, a computer, such as a central/network administration computer, in communication with node 18 may include at least one of congestion control function 26, congestion control configurations database 30, service contexts database 32, pre-emption function 34 and ARP based congestion control function 36. The computer uses congestion management system 28 to reduce congestion on node 18.

Node 18 may experience different levels of congestion, depending on the amount of traffic being processed at node 18. The level of congestion experienced by node 18 may range, for example, from level '1' to level 'n,' where level '1' may be the lowest possible level of congestion that node 18 may experience, and level 'n' may be the highest possible congestion that node 18 may experience. In an exemplary embodiment, congestion control function 26 may manage congestion by determining which services on node 18 are critical and which services are less critical, and pre-empting less critical services during congestion. When node 18 experiences a period of congestion, the services that are less critical are considered good candidates for release during congestion periods.

Congestion management system 28 periodically monitors congestion on node 18 and pre-empts services on node 18 on a continuous basis. Congestion management system 28 operates to keep the level of congestion on node 18 below a certain level, which may prevent congestion on node 18 from reaching levels that affect the QoS requirement of the traffic in the network. Node 18 may reach a pre-determined congestion level which triggers actions to alleviate the congestion on node 18, such as pre-emption of services of node 18. Congestion control may be triggered by a congestion level instead of being triggered by a request from an admission control function attempting to start yet another service on an already congested node 18. By constantly monitoring the level of congestion on node 18, situations where node 18 is congested to the point where node 18 may not be able to process another service, may be avoided.

For example, admission control may attempt to avoid congestion by only admitting a specific type of service or a service with a specific priority. Admission control reacts to congestion on node 18, as opposed to pro-actively preventing a congestion by pre-empting services on a continuous basis and keeping the level of congestion low. This results in admission control having to wait to pre-empt a service, at the time of service admission, such as when an incoming service is requesting admission. Node 18 may be already in a congested state when the status of node 18 requires pre-emption of a service before another service may be admitted. Thus, pre-emption of other less important services need not be delayed or occur until a service is requesting admission.

In another exemplary embodiment, services of node 18 may be pre-empted as part of routine maintenance. The level of congestion of node 18 may be ascertained as unacceptable, and low priority services may be removed. In the case when the congestion is above an acceptable threshold, such as when node 18 is very congested, low and/or high priority services are pre-empted, freeing node 18 to process services with the highest priorities, such as, emergency services and VoIP services.

Congestion control function 26 may lower the congestion level of node 18 by, for example, admitting, rejecting or pre-empting existing services. Congestion control function 26 evaluates a number of different conditions in determining whether a service request should be accepted, rejected or pre-empted. Conditions may include channel status, the QoS requirements for the service, the state of the buffers of node 18, the overall network congestion level, a characteristic of the service, a status associated with the service, a UE's identification, a service type, etc. A service may be unidirectional or bidirectional, and each direction consists of one or more bearers. Lowering the congestion level on node 18 may include pre-empting at least one service on node 18. Pre-empting may include partially removing the service or completely removing the service and the resources associated with the service. Congestion control function 26 determines the level of congestion experienced by node 18. Alternatively, the congestion level on node 18 may be determined by a congestion level function. Congestion control function 26 or the congestion level function may measure different system resources, such as memory, packet queue lengths, wireless link characteristics, a signal to interference plus noise ratio ("SINR"), continuous quality improvement ("CQI"), multiple core scaling ("MCS"), etc., to determine the level of congestion on the network. In order to alleviate the congestion on node 18, congestion control function 26 determines which services on node 18 are candidates for pre-emption. Congestion control function 26 may determine which services may be pre-empted using congestion pre-emption criteria associated with a congestion level.

Congestion control configurations database 30 includes congestion pre-emption criteria associated with a respective congestion level on node 18, i.e., predetermined preemption thresholds. The congestion pre-emption criteria may be predetermined, and may include data corresponding to a service, e.g. a service characteristic. A service characteristic may include, but may not be not limited to an ARP priority level, a QCI priority level, a resource type (GBR or non-GBR), a service type, e.g., a VoIP, buffered video, streaming video, best effort traffic, etc., and an ARP pre-emption vulnerability value associated with a service on node 18.

An ARP pre-emption vulnerability value may be a pre-emption vulnerability flag value that indicates whether a service can be pre-empted. The decision to pre-empt a service may also be influenced by two priorities: the QCI priority level (which may be the same priority defined by 3GPP 23.203 Rel. 11, section 6.1.7 and table 6.1.7) and the ARP priority level that comes with the bearer creation request, the bearer modification request or transfer between two eNodeB, i.e., base station, nodes as part of the mobility procedures. The two mentioned priorities, i.e., the QCI priority level and the ARP priority level, may be combined to create one single pre-emption priority which is used as part of the congestion pre-emption criteria of a service.

Congestion control configurations database 30 may include a congestion control configuration. The congestion control configuration may include a mapping of congestion levels to corresponding congestion pre-emption criteria, i.e., to predetermined preemption thresholds. Each congestion level may be associated with a corresponding different congestion pre-emption criteria, i.e., the congestion pre-emption criteria corresponding to a first congestion level may be different than congestion pre-emption criteria corresponding to a second congestion level.

The congestion control configuration may be updated to reflect and meet the needs of network 10 and node 18. For example, the congestion control configuration may be updated when node 18 is congested and the congestion control configuration does not include congestion pre-emption criteria, i.e., predetermined preemption thresholds, to pre-empt existing services on node 18. If the congestion control configuration does not include congestion pre-emption criteria that can pre-empt enough existing services to ease congestion, node 18 may remain congested. For example, the congestion control configuration may include services with service type of non-GBR, i.e., non-GBR services may be pre-empted. However, the services on node 18 may all be GBR services. In this case, the congestion control configuration does not include congestion pre-emption criteria that correspond to services on node 18, as none of the services on node 18 are non-GBR. When the congestion control configuration does not include criteria that will pre-empt existing services on node 18, the configuration control configuration may be modified. The congestion control configuration may be updated manually or automatically.

Congestion control configurations database 30 may store exemplary Table 1. Table 1 shows an exemplary mapping between congestion levels and corresponding congestion pre-emption criteria. In this exemplary embodiment, the congestion pre-emption criteria include priority levels and a resource type. Specifically the congestion pre-emption criteria includes an ARP priority level (the ARP priority to be compared with the ARP priority associated with the services when building the pre-emption candidate list), a resource type (the resource type to be compared with the resource type associated with services when building the pre-emption candidate list. The resource type to associate a service is configured in the QCI table as specified in 3GPP TS 23.203 Release 11 standard), and a QCI priority level (the priority to be compared with the priority associated a service when building the pre-emption candidate list. The resource type to associate with a service is configured in the QCI table as specified, for example, in the 3GPP TS 23.203 Release 11 standard). The ARP priority level may range from 1 to 15 ([1,15]), and may be used in the same way as defined in 3GPP TS 23.203 Release 11 standard, where 1 is the highest ARP priority level value and 15 is the lowest ARP priority level value. The QCI priority level may range from 1 to 225 ([1,225]), and may be used as defined in 3GPP TS 23.203 Release 11 standard, where 1 is the highest priority level and 225 is the lowest priority level.

TABLE 1

Sample Service Pre-emption Criteria with Congestion Levels to Pre-emption Thresholds Mapping

| Congestion Level | Highest ARP Priority to pre-empt | Resource Type | Highest QCI Priority level to pre-empt |
|---|---|---|---|
| 1 (lowest) | 12 | non-GBR | n/a |
| 2 | 10 | non-GBR | 50 |
| 3 | 7 | GBR, non-GBR | n/a |
| n (highest) | 4 | GBR, non-GBR | 5 |

The QCI priority level is configured in the QCI table of the eNodeB. In one embodiment, there is one instance of the QCI table per eNodeB. The ARP priority level is sent to the eNodeB in the E-RAB Setup request, which is the signal that contains the request to create a service for a UE. As such, the ARP priority level is not configured at the eNodeB. The ARP parameter contains three components: a single scalar value and two flag values. An example of the structure of a QCI table entry and a ARP parameter is shown below:

QCI table entry={priority level (1 . . . 225); Resource Type (GBR or non-GBR); etc.}

ARP parameter={ARP priority level (1 . . . 15); ARP pre-emption capability value (a flag set to either true or false); ARP pre-emption vulnerability value (a flag set to either true or false)}

Congestion control function 26 requests congestion pre-emption criteria associated with the current congestion level on node 18 from congestion control configuration database 30. Congestion control configuration database 30 receives the request from congestion control function 26, which may include the congestion level on node 18. Congestion control configurations database 30 determines the congestion pre-emption criteria, i.e., the predetermined preemption thresholds, associated with the congestion level. Congestion control configurations database 30 sends the congestion pre-emption criteria corresponding to the congestion level on node 18 to congestion control function 26. Congestion control function 26 may receive from congestion control configurations database 30 the congestion pre-emption criteria corresponding to the congestion level. Congestion control function 26 may analyze the returned congestion pre-emption criteria using, for example, a Boolean operation.

In an exemplary embodiment, when the congestion level on node 18 is 1, congestion pre-emption criteria includes an ARP priority level value of '12' and a resource type of non-GBR. Therefore, when congestion control function 26 requests congestion pre-emption criteria associated with a congestion level of 1 from congestion control configurations database 30, congestion control configurations database 30 returns an ARP priority level value of '12' and a resource type of non-GBR. In this example, when the congestion level of 1, a QCI priority level is not used as criteria to pre-empt a service. For example, the QCI priority level associated with a congestion level of 1 may be 0, as it may be non-applicable ("N/A"). The service type, resource type, and QCI priority level, ARP priority level, ARP pre-emption capability field, ARP pre-emption vulnerability field may be the same parameters defined in the 3GPP TS 23.203 Release 11 standard. The present invention may use the above mentioned parameters and the congestion level of a system to decide on the order in which services are pre-empted. In order to comply with TS 23.203, services pre-empted have the ARP pre-emption vulnerability flag set to true.

Table 1 shows that a congestion level of '2' is mapped to congestion pre-emption criteria that includes an ARP priority level value of '10,' a resource type of non-GBR and a QCI priority level of '50.' When the congestion level is '3,' congestion control configurations database 30 returns congestion pre-emption criteria that includes an ARP priority level value of '7' and a resource type of non-GBR to congestion control function 26. When the congestion level is 3, a QCI priority level is not used as criteria to pre-empt a service. For example, the QCI priority level associated with a congestion level of 3 can be considered as the lowest, i.e., 255, as it is N/A. When node 18 experiences the highest congestion level possible, i.e., the congestion level is 'n,' the congestion pre-emption criteria includes an ARP priority level value of '4' and a QCI priority level of '5.' Congestion control function 26 uses the congestion pre-emption criteria returned by congestion control configurations database 30 to determine whether a service on node 18 may be pre-empted. For instance, congestion control function 26 determines that when the service pre-emption criteria of a service is at least equal to the congestion pre-emption criteria, the service is pre-emptable.

Service contexts database 32 includes a correlation of services on node 18 and service pre-emption criteria, i.e., service characteristics, associated each service. Each service on the list is associated with service pre-emption criteria that may include QoS parameters. Congestion control function 26 requests a list of services that are associated with a service pre-emption criteria corresponding to the congestion pre-emption criteria from service contexts database 32. The congestion pre-emption criteria is returned to congestion control function 26 from congestion control configurations database 30. Congestion control function 26 sends the congestion pre-emption criteria returned from congestion control configurations database 30 to service context database 32 to retrieve services associated with service pre-emption criteria that conform to the congestion pre-emption criteria. For example, service context database 32 may include a first service associated with a first service pre-emption criteria that includes an ARP priority level value of 20 and a resource type non-GBR. Service context database 32 may also include a second service associated with a second service pre-emption criteria that includes an ARP priority level value of 10 and a resource type non-GBR. In this example, it is assumed that the QCI priority level is not considered part of the criteria for determining whether to pre-empt a service.

Service contexts database 32 includes a correlation as shown in Table 2 below:

TABLE 2

Sample Service Contexts

| Service | ARP priority level (signaled with the service requests) | ARP pre-emption vulnerability field (signaled with the service requests) | QCI (signaled with the service requests). This is an index into the QCI table (see table 3 below) |
| --- | --- | --- | --- |
| First Service | 15 | pre-emptable | 25 |
| Second Service | 10 | not pre-emptable | 1 |

TABLE 3

Sample QCI Table (configured at the eNodeB)

Sample QCI Table (not all columns shown)

| QCI | Priority | Resource Type | Service Type |
| --- | --- | --- | --- |
| 1 | 1 | GBR | VoIP |
| ... | | | |
| 25 | 30 | non-GBR | FTP |
| ... | | | |
| 255 | 250 | non-GBR | Web browsing |

In this exemplary embodiment, the congestion level on node 18 may be '1.' Congestion control function 26 requests congestion pre-emption criteria corresponding to a congestion level of '1' from congestion control configurations database 30. Congestion control configurations database 30 returns an ARP priority level value of '12' and a resource type of non-GBR, as shown in Table 1. Congestion control function 26 uses the congestion pre-emption criteria to request a list of services on node 18 associated with the congestion pre-emption criteria from service contexts database 32, i.e., an ARP priority level value of at least '12' and a resource type of non-GBR.

Service contexts database 32 returns a list of services on node 18 to congestion control function 26. The list may include at least one service on node 18. The list is a list of potential service pre-emption candidates associated with service pre-emption criteria, i.e., service characteristics, corresponding to the congestion pre-emption criteria. The potential service pre-emption candidates may be listed in order of priority. In this exemplary embodiment, service contexts database 32 determines, by analyzing Table 2, which services are associated with an ARP priority level value of at least '12' and a resource type of non-GBR. Service contexts database 32 returns the first service associated with first service pre-emption criteria since the first service includes an ARP priority level value of '15,' i.e., an ARP priority level value of at least '12', and a resource type non-GBR. If service context database had other non-GBR services associated with ARP priority level values of at least '12,' such as '14,' those services will be returned to congestion control function 26.

Service contexts database 32 does not return the second service associated with second service pre-emption criteria that includes an ARP priority level value of 10 and a resource type non-GBR, given that the ARP priority level value of 10 is higher than the congestion pre-emption criteria (ARP priority level value of '12'). The ARP priority level value associated with the second service is not at least '12,' and therefore, second service is not a candidate for pre-emption. The list of potential service pre-emption candidates may be a sub-set of all services on the node. The service pre-emption criteria associated with each potential service pre-emption candidate is used to determine whether a service may be pre-empted. In some cases, the service pre-emption criteria may be different for each service, and in some other cases, some services may have the same service pre-emption criteria. By way of example, a third service may be associated with an ARP priority level value of '10,' just like exemplary second service of Table 2.

Service contexts database 32 may also include information regarding services on node 18, such as a service data flow ("SDF") associated with a service. The SDF of a service may be associated with QoS parameters. Service contexts database 32 may also store the IP parameters of the packets in the SDF, which are used to uniquely identify the SDF. SDFs can be thought of as a set of packet flows, typically IP flows. Policy and charging control rules are used to classify traffic by service data flow.

Service pre-emption criteria may include QoS parameters associated with a service, e.g., service characteristics. QoS may specify service levels in terms of throughput, latency, jitter/delay variation, packet error and packet loss, among others. Service context database 32 may store different service levels for different streams of traffic in SDFs. Services are classified and processed differently depending on the level of service specified in the QoS parameters associated with the services. Service characteristic and QoS parameters stored in service contexts database 32 may include a Quality of Service Class Identifier ("QCI"), a Guaranteed Bit Rate ("GBR"), a Maximum Bit Rate ("MBR"), an Aggregate Maximum Bit Rate ("AMBR"), and an Allocation and Retention Priority ("ARP"), among others.

The QCI specifies how packets specific to a service or application are forwarded. The QCI may be a scalar that may be used as a reference to access node-specific parameters that control bearer level packet forwarding treatment, e.g. scheduling weights, admission thresholds, queue management thresholds, link layer protocol configuration, etc. As such, the QCI may include, but may not be limited to, packet forwarding characteristics. Different services, such as a live streaming, real time gaming, video, etc., may be associated with different QCIs in a QCI table. The QCI value may be pre-configured by an operator. After a bearer is established, the QCI parameter determines how a node will treat a packet for the bearer, i.e., the QCI parameter tells the node how to prioritize resources among packets from different bearers.

The QCI value may include a resource type parameter, a packet delay buffer ("PDB"), a QCI priority level, a packet error loss rate ("PELR") parameter, and a service associated with the above values, among others. A node uses a QCI table that includes the different QCI values for each resource type to determine packet forwarding treatment. The resource type parameter differentiates between GBR flows and non-GBR flows. The PDB parameter defines an upper bound for the delay of a packet. This upper bound may be a soft limit so that, if the packet exceeds the PDB value, the packet may not be discarded. The QCI priority level parameter indicates the priority value used for scheduling the service. The PELR parameter refers to a packet error loss rate, i.e., packets that were not successfully delivered. Packet loss may be caused by a number of factors including signal degradation, channel congestion, packet corruption, signal noise, hardware failure, etc.

The QoS GBR parameters denote a bit rate that a bearer may be expected to provide. A bearer may be considered a GBR type if the bearer supports a guaranteed bit rate. The MBR parameter indicates a maximum bit rate for the uplink and downlink component of the service data flow. The MBR parameter specifies the maximum bit rate that the SDF may consume, and is used to discard any excess traffic. The MBR parameter limits the bit rate is expected to be provided by a GBR bearer. The AMBR parameter specifies the aggregate maximum bit rate for non-GBR flows.

Service pre-emption criteria, i.e., service characteristics, stored in service contexts database 32 may also include ARP parameters corresponding to a service on the node. The ARP parameter indicates the priority of allocation and retention of an SDF. The ARP parameter is used for the allocation of the bearer resources at, for example, session setup, during handover mechanisms and during resource pre-emption. The ARP parameter is also used to resolve conflicts when different services demand network resources. For example, when network resources are scarce, the ARP parameter is used to prioritize the allocation of resources during bearer establishment and modification. Further, the ARP parameter may determine whether a bearer establishment or modification request can be accepted or whether the establishment or modification request needs to be rejected to avoid network congestion. An SDF with a lower ARP priority level may be dropped in order to free up network resources for an SDF with a higher ARP priority level.

The ARP parameter includes multiple fields, such as an ARP pre-emption capability field, an ARP pre-emption vulnerability field and an ARP priority level field. The ARP priority level field defines the relative importance of a resource request, i.e., the ARP priority level. This ensures that requests from a bearer with a higher ARP priority level are given preference over bearers with a lower ARP priority level. The ARP priority level may aid in deciding whether a bearer establishment or modification request can be accepted or needs to be rejected in case of resource limitations (typically used for admission control of GBR traffic). The ARP priority level can also be used to decide which existing bearers can be pre-empted when the resources are limited.

The ARP pre-emption capability and the ARP pre-emption vulnerability may be a flag, which may be set to either 'true' or 'false.' The ARP pre-emption capability defines whether a service data flow can get resources that were already assigned to another service data flow with a lower ARP priority level. If the ARP pre-emption capability value is set to 'true,' the service can pre-empt existing services with lower ARP priority level values. The ARP pre-emption capability value defines whether or not a bearer is allowed to preempt other bearers with a lower ARP priority level.

The ARP pre-emption vulnerability defines whether a service data flow can lose the resources assigned to it in order to admit a service data flow with a higher ARP priority level. If the ARP pre-emption vulnerability value is set to 'true,' the service can be pre-empted by other services with higher ARP priority level values. The ARP pre-emption vulnerability value defines whether or not a bearer is susceptible to preemption by bearers with a higher ARP priority level.

As such, a service uses and establishes a bearer associated with ARP parameters to transmit packets. The ARP priority level value may range from 1 to 15, the ARP pre-emption capability value indicates whether the service is capable to preempt or not capable to preempt, and the ARP pre-emption vulnerability value indicates whether a service is pre-emptable or not pre-emptable by another service. An ARP priority level indicates which services should be pre-empted first, e.g., the services with the lowest ARP priority level values. For example, service A can pre-empt service B if the following conditions are true: service A has a higher ARP priority level than B, service A has the ARP pre-emption capability flag set to true, and service B has the ARP pre-emption vulnerability flag set to true. When resources are limited, node 18 may drop a bearer associated with an ARP that indicates a low priority level. The pre-emption capability information of the ARP is used to determine whether a bearer with a lower ARP level may be dropped to free up the required resources. ARP is used during admission or allocation (setup signaling) of the bearer. ARP parameters of two bearers are compared to determine whether an existing bearer can be de-allocated to make space for a new bearer. The priority level information of the ARP is used to ensure that the request of the bearer with the higher priority level is preferred.

The ARP pre-emption vulnerability information of the ARP parameter defines whether a bearer is applicable for such dropping by a pre-emption capable bearer with a higher ARP priority level value. For example, during handover, if there are not enough resources due to system congestion, the ARP parameter decides which bearer can be dropped from the bearers allocated to a UE. The ARP pre-emption vulnerability value defines whether a bearer may be dropped by a pre-emption capable bearer with a higher ARP priority level value. An ARP priority level associated with a service may be defined by $3^{rd}$ Generation Partnership Project ("3GPP") standards as a "priority." The ARP priority level, ARP pre-emption capability (flag) and pre-emption vulnerability (flag) may be signaled with each service during service creation and/or service modification procedures. The ARP parameter may be used by a function, such as an ARP pre-emption function 34 or an admission control function, to determine which services to pre-empt. Existing services may be removed to make room for a new incoming service when there is not enough system resources available for new incoming services. The QCI priority level and the resource type are part of a QCI record configured locally in node 18. The QCI priority level and the resource type may be defined by 3GPP with values for the first nine QCIs, i.e., 1 to 9. QCI values of 10 to 255, or even other ranges, may also be supported as vendor specific QCIs. The QCI value corresponding to a service is signaled with the service during service creation procedures and, optionally, during a service modification procedure.

In an exemplary embodiment, congestion control function 26 receives a list of potential service pre-emption candidates from service context database 32. The list may be organized by priority of the services. For example, services that are associated with a low priority may be listed before services that are associated with a higher priority, so that the low priority services are pre-empted before the high priority services. The services are associated with a service identifier. Congestion control function 26 may send at least one service identifier associated with at least one service from the list of potential service pre-emption candidates to pre-empt to pre-emption function 34. Congestion control function 26 chooses a service to pre-empt based on, for example, the location of the service on the list, a priority associated with a service, a user's input/request for pre-emption of a specific service, etc.

Pre-emption function 34 may be an ARP pre-emption function that pre-empts services on node 18 in order to alleviate congestion on node 18. Pre-emption function 34 receives from ARP congestion control function 36 a service identifier associated with a potential service pre-emption candidate. Pre-emption function 34 handles pre-emption using different pre-emption techniques. Pre-emption function 34 may pre-empt a service either partially or fully. Pre-emption function 34 may use a pre-emption algorithm to drop active bearers and may work with the admission control function to block new bearer requests depending on the congestion conditions on node 18. Once a service has been pre-empted, pre-emption function 34 notifies congestion control function 26 that the service has been successfully pre-empted. If pre-emption function 34 was unable to pre-empt the service, pre-emption function 34 will inform congestion control function 26. In response, congestion control function 26 may choose a different service to pre-empt.

Figure 3:
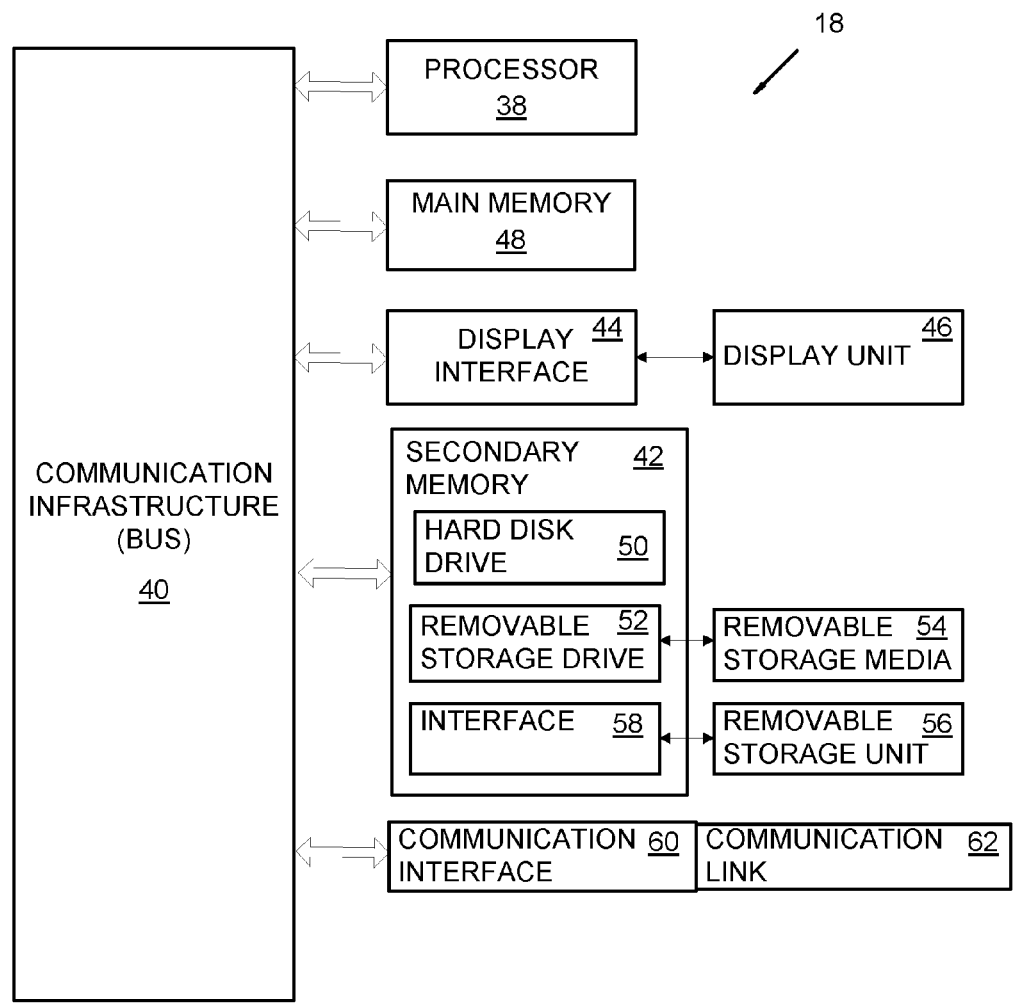
FIG. 3 is a block diagram of an exemplary node, constructed in accordance with the principles of the present invention.

FIG. 3 is a block diagram of an exemplary node 18 constructed in accordance with the principles of the present invention. Node 18 includes one or more processors, such as processor 38 programmed to perform the functions described herein. Processor 38 is operatively coupled to a communication infrastructure 40, e.g., a communications bus, cross-bar interconnect, network, etc. Processor 38 may execute computer programs stored on disk storage for execution via secondary memory 42. Processor 38 may implement flow control functionality in order to classify a service data flow in accordance with a user's subscription QoS profile. Additionally, processor 38 may determine whether UE 14 is subscribed to a specific service, i.e., whether UE 14 has appropriate permission privileges to receive the specific service. Processor 38 performs functionality regarding the establishment, maintenance and release of a bearer. Additionally processor 38 may establish connections between data network 16 and UE 14 that require a security level.

Node 18 may optionally include or share a display interface 44 that forwards graphics, text, and other data from the communication infrastructure 40 (or from a frame buffer not shown) for display on the display unit 46. Display 46 may be a cathode ray tube (CRT) display, liquid crystal display (LCD), light-emitting diode (LED) display, and touch screen display, among other types of displays. Node 18 also includes a main memory 48, such as random access memory ("RAM") and read only memory ("ROM"). Main memory 48 may store congestion control configurations database 30 and service contexts database 32. Congestion control configurations database 30 and service contexts database 32 may not be stored in node 18, and instead may be stored at a computer in communication with node 18, which may transmit data in congestion control configurations database 30 and service contexts database 32 to node 18. Memory 48 may store information about UE 14 that may be used by node 18 in order to authenticate, receive and transmit data to UE 14.

Secondary memory 42 may include, for example, a hard disk drive 50 and/or a removable storage drive 52, representing a removable hard disk drive, magnetic tape drive, an optical disk drive, a memory stick, etc. The removable storage drive 52 reads from and/or writes to a removable storage media 54 in a manner well known to those having ordinary skill in the art. Removable storage media 54, represents, for example, a floppy disk, external hard disk, magnetic tape, optical disk, etc. which is read by and written to by removable storage drive 52. As will be appreciated, the removable storage media 54 includes a computer usable storage medium having stored therein computer software and/or data.

In alternative embodiments, secondary memory 42 may include other similar devices for allowing computer programs or other instructions to be loaded into the computer system and for storing data. Such devices may include, for example, a removable storage unit 56 and an interface 58. Examples of such may include a program cartridge and cartridge interface (such as that found in video game devices), flash memory, a removable memory chip (such as an EPROM, EEPROM or PROM) and associated socket, and other removable storage units 56 and interfaces 58 which allow software and data to be transferred from the removable storage unit 56 to other devices.

Node 18 may also include a communications interface 60. Communications interface 60 allows software and data to be transferred to external devices, e.g., other nodes 18. Examples of communications interface 60 may include a modem, a network interface (such as an Ethernet card), a communications port, a PCMCIA slot and card, wireless transceiver/antenna, etc. Software and data transferred via communications interface/module 60 may be, for example, electronic, electromagnetic, optical, or other signals capable of being received by communications interface 60. These signals are provided to communications interface 60 via the communications link (i.e., channel) 62. Channel 62 carries signals and may be implemented using wire or cable, fiber optics, a phone line, a cellular phone link, an RF link, and/or other communications channels.

It is understood that node 18 may have more than one set of communication interface 60 and communication link 62. For example, node 18 may have a communication interface 60/communication link 62 pair to establish a communication zone for wireless communication, a second communication interface 60/communication link 62 pair for low speed, e.g., WLAN, wireless communication, another communication interface 60/communication link 62 pair for communication with optical networks, and still another communication interface 60/communication link 62 pair for other communication.

Computer programs (also called computer control logic) are stored in main memory 48 and/or secondary memory 42. For example, computer programs are stored on disk storage, i.e. secondary memory 42, for execution by processor 38 via RAM, i.e. main memory 48. Computer programs may also be received via communications interface 60. Such computer programs, when executed, enable the method and system to perform the features of the present invention as discussed herein. In particular, the computer programs, when executed, enable processor 38 to perform the features of the corresponding method and system. Accordingly, such computer programs represent controllers of the corresponding device.

In an exemplary embodiment, processor 38 may be a congestion controller that determines congestion pre-emption criteria corresponding to a congestion level of node 18. Processor 38 determines a congestion level on node 18 using congestion control function 26 and/or ARP based congestion control function 36. Processor 38 retrieves from congestion control configurations database 30, congestion pre-emption criteria associated with or corresponding to the determined congestion level of node 18. Processor 38 queries service context database 32 using the congestion pre-emption criteria, and request a list of services that are associated with a service pre-emption criteria corresponding to the congestion pre-emption criteria.

Service context database 32 determines which services have a service pre-emption criteria that is in accordance with the congestion pre-emption criteria. For example, service context database 32 may select services with a service pre-emption criteria that is in part equal to, greater than, less than, or related to the congestion pre-emption criteria. Boolean operators, such as "and," "or," "and also," "or else," and "xor," binary operators, or any other logical operator may be used to determine which services to select. Processor 38 retrieves from service context database 32 a list of potential service pre-emption candidates associated with service pre-emption criteria that is at least equal to the congestion pre-emption criteria.

In order to determine which services to pre-empt from the list of potential service pre-emption candidates, processor 38 may compare, for example a predetermined ARP priority level threshold to an ARP priority level value associated with the service, a predetermined QCI priority level threshold to a QCI priority level associated with the service, and/or a pre-determined resource type of a service to a resource type associated with the service. Processor 38 compares the predetermined preemption thresholds to the corresponding service characteristics. Processor 38 determines whether to pre-empt the service based at least in part on the ARP priority level value associated with the service, a QCI priority level associated with the service and/or a resource type associated with the service, provided that the service has the ARP pre-emption vulnerability flag set to true. The above pre-emption criteria is exemplary, as other criteria may be used to pre-empt a service. Processor 38 determines a service, from the list of potential service pre-emption candidates, to pre-empt based on a system request, a position of a service on a list, the network's demand, a characteristic of a service, etc. Pre-emption function 34 pre-empts a service selected for pre-emption.

Various software embodiments are described in terms of this exemplary computer system. It is understood that computer systems and/or computer architectures other than those specifically described herein can be used to implement the invention. It is also understood that the capacities and quantities of the components of the architecture described below may vary depending on the device, the quantity of devices to be supported, as well as the intended interaction with the device. For example, configuration and management of node 18 may be designed to occur remotely by web browser. In such case, the inclusion of a display interface and display unit may not be required.

Figure 4:
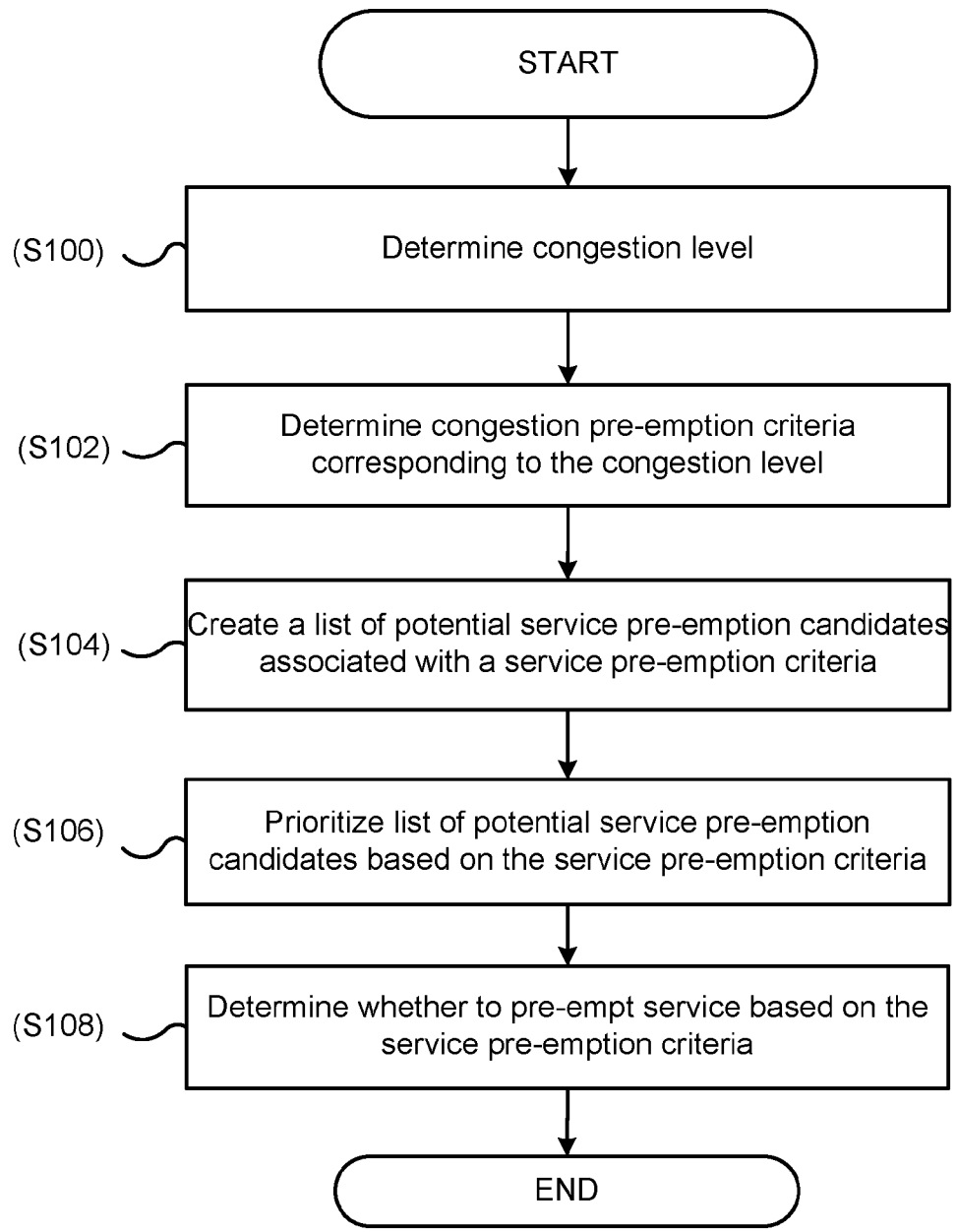
FIG. 4 is a flow chart of an exemplary process for managing congestion in a communication network, in accordance with the principles of the present invention.

FIG. 4 is an exemplary flowchart for pre-empting a service on node 18, in accordance with the principles of the present invention. A congestion level on node 18 is determined (Step S100). Congestion pre-emption criteria corresponding to the congestion level is determined (Step S102). Congestion control function 26 requests congestion pre-emption criteria mapped to the congestion level on node 18 from congestion control configurations database 30. Congestion control configurations database 30 returns to congestion control function 26 congestion pre-emption criteria mapped to the congestion level. Congestion control function 26 queries service contexts database 32 for services on node 18 that are associated with a service pre-emption criteria that are at least equal to the congestion pre-emption criteria. Service contexts database 32 returns services that are associated with service pre-emption criteria to congestion control function 26 that are at least equal to the congestion pre-emption criteria. A list of potential service pre-emption candidates associated with service pre-emption criteria that is at least equal to the congestion pre-emption criteria is created (Step S104). The list of potential service pre-emption candidates may be prioritized based on the service pre-emption criteria (Step S106). For example, the list of services may be ordered by priority. A determination is made as to whether to pre-empt a service based on the service pre-emption criteria (Step S108). Congestion control function 26 sends a service identification corresponding to a service on the list to pre-emption function 34, so that pre-emption function 34 may pre-empt the service. Since a service may consist of multiple radio bearers and transport bearers for either uplink, downlink, or both directions, pre-emption function 34 may release resources of bearers for different traffic directions.

Figure 5:
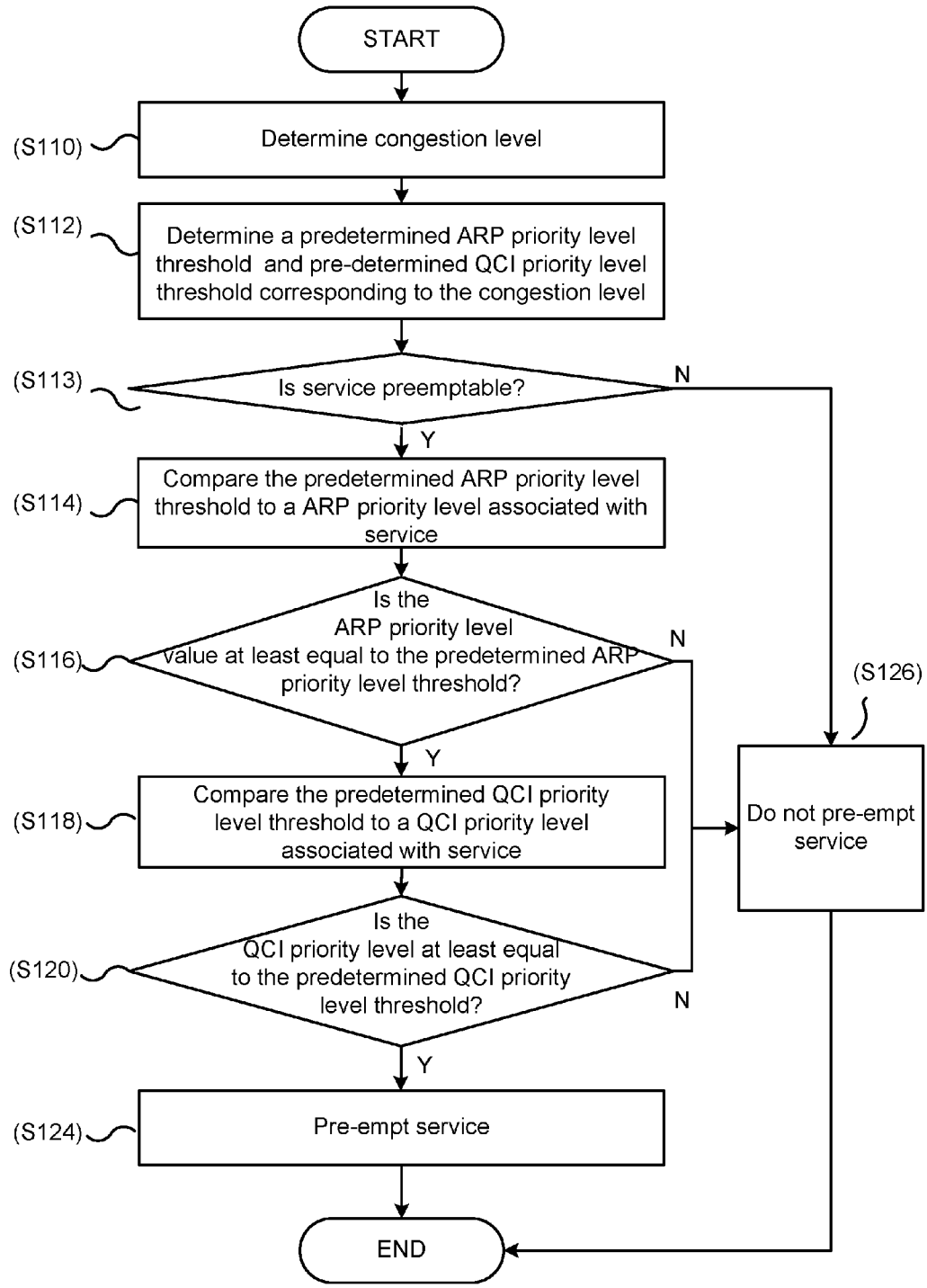
FIG. 5 is a flow chart of another exemplary process for managing congestion in a communication network, in accordance with the principles of the present invention.

FIG. 5 is a flowchart of another exemplary process for pre-empting a service based on a ARP priority level and a QCI priority level associated with the service. Pre-determined pre-emption criteria thresholds are determined in order to compare the corresponding pre-emption related values/characteristics associated with a service, such as the ARP pre-emption vulnerability value, the ARP priority level value, the QCI priority level value, and the resource type. A congestion level on node 18 is determined (Step S110). Congestion pre-emption criteria including a predetermined ARP priority level threshold and a predetermined QCI priority level threshold corresponding to the congestion level are determined (Step S112). A determination is made as to whether the pre-emption vulnerability value allows pre-emption for a service (Step S113). If so, the predetermined ARP priority level threshold is compared to an ARP priority level value associated with a service (Step S114). If not, the service is not preempted (Step S126). A determination is made as to whether the ARP priority level value is at least equal to the predetermined ARP priority level threshold (Step S116). If so, the predetermined QCI priority level threshold is compared to a QCI priority level value associated with the service (Step S118). Else, if the ARP priority level value is not at least equal to the predetermined ARP priority level threshold, the service is not preempted (Step S126). A determination is made as to whether the QCI priority level is at least equal to the predetermined QCI priority level threshold (Step S120). If the QCI priority level value is at least equal to the predetermined QCI priority level threshold, the service is pre-empted (Step S124). Else, the service is not pre-empted (Step S126). If the ARP priority level value is at least equal to the predetermined ARP priority level threshold and the QCI priority level value is at least equal to the predetermined QCI priority level threshold, then the service is pre-empted. For example, if the predetermined QCI priority level threshold is '200,' then services with a QCI priority level of '200' to '255' are pre-empted. If none of the services on node 18 have a QCI priority level ranging from '200' to '255,' then no services will be pre-empted. The congestion pre-emption criteria can be modified so that services on node 18 may be pre-empted. The pre-emption criteria may be modified, for example by changing the predetermined QCI priority level threshold to '50,' as to encompass more services, i.e., services with a QCI priority level ranging from '50' to '255' may be pre-empted.

In an exemplary embodiment, services are pre-empted for a specific congestion level, based at least on the ARP parameter and a resource type associated with the services. According to exemplary Table 1, for a congestion level of '1,' the congestion pre-emption criteria includes an ARP priority level value of '12' and a resource type of non-GBR. An ARP priority level value may range from 1 to 15, where 1 may be the highest ARP priority level value associated with a service and 15 may be the lowest ARP priority level value associated with a service. Congestion control configurations database 30 returns to ARP congestion control function 36 congestion pre-emption criteria associated with a congestion level of '1,' i.e., an ARP priority level value of '12' and a resource type of non-GBR.

Congestion control function 26 includes ARP based congestion control function 36. Congestion control function 26 may determine a congestion level on node 18. Congestion levels are mapped to service pre-emption criteria. By pre-empting services, resources are freed during congestion periods in order to lower the congestion levels of the network. Congestion levels on a node, such as an LTE node, may be lowered by pre-empting, i.e., releasing, services based on configured criteria. Since the congestion level of the system may vary, different levels of system congestion may impact different services. A level of congestion may be mapped to criteria used to selected services that may be impacted at that level of congestion. The resources measured by congestion control function 26 to determine the system congestion level may include, but may not be limited to memory, air interface bandwidth, physical resource blocks ("PRBs"), control channel elements ("CCEs"), number of UEs being serviced, number of bearers in the system, amount of aggregated GBR, CPU utilization, etc.

Continuing with the exemplary embodiment, ARP based congestion control function 36 queries service contexts database 32 for pre-emptable services corresponding to the congestion pre-emption criteria associated with a congestion level of '1.' Pre-emptable services are associated with an ARP pre-emption vulnerability value set to true, which allows pre-emption function 34 to pre-empt the service. Service contexts database 32 returns a list of services, i.e., non-GBR services associated with service pre-emption criteria that is at least equal to the congestion pre-emption criteria to ARP based congestion control function 36.

For example, first service in Table 2 is returned, as first service has an ARP priority level value of 15. ARP based congestion control function 36 compiles a list of services that may be candidates for pre-emption. The pre-emption list may be built using criteria that may include a level of congestion detected on the node, cell and/or network, an ARP pre-emption vulnerability value associated with a service, a QCI priority level, a resource type and an ARP priority level of services currently in the network. The ARP priority level, the QCI priority level and the resource type associated with the services may be used to determine whether a service may be pre-empted when the congestion exceeds a predetermined threshold level.

In this exemplary embodiment, a pre-emptable service having a resource type of non-GBR is pre-empted when the ARP priority level value of the service is at least equal to the predetermined ARP priority level threshold of '12.' As such, a congestion level of '1' may trigger the pre-emption of non-GBR services having an ARP pre-emption vulnerability flag set to 'true' and an ARP priority level value of 12 or below, i.e., pre-emptable non-GBR services with an ARP priority level value of 12, 13, 14 and 15 may be pre-empted. In this example, the first service in Table 2 may be pre-empted.

In another exemplary embodiment, congestion pre-emption criteria may include, in addition to an ARP priority level value and a resource type, a QCI priority level. A QCI priority level associated with a service may range from 1-255, where '1' may be the highest QCI priority level that a service may have and '255' may be the lowest QCI priority level that a service may have. The QCI priority level may or may not be considered when determining whether to preempt a service for a specific congestion level. For example, when the congestion level is '1,' a QCI priority level may not be considered when determining whether a service may be pre-empted. Services associated with high QCI parameters may include streaming and interactive services, while services with low QCI parameters may include services that run in the background and are not critical.

In yet another exemplary embodiment, the congestion level on node 18 may be '2.' Congestion control function 26 queries congestion configurations database 30 for a congestion pre-emption criteria mapped to a congestion level of '2.' Congestion control configurations database 30 returns to congestion control function 26 the congestion pre-emption criteria associated with a congestion level of '2.' As shown in exemplary Table 1, for a congestion level of '2,' the congestion pre-emption criteria includes an ARP priority level value of '10,' a resource type of non-GBR, and a QCI priority level of '50.' Additionally, the ARP pre-emption vulnerability flag of the service should be set to 'true,' i.e., the service should be pre-emptable.

Congestion control function 26 queries service contexts database 32 for pre-emptable non-GBR services associated with service pre-emption criteria that include an ARP priority level value of at least '10,' a resource type of non-GBR and a QCI priority level of at least '50.' Service contexts database 32 returns a list of pre-emptable non-GBR services on node 18 associated with an ARP priority level value of at least '10' and a QCI priority level of at least '50.' A list of pre-emptable non-GBR services associated with ARP priority level values of at least '10' and a QCI priority level of at least '50' are returned to congestion control function 26 ordered by priority level, where the list priority is determined by taking into consideration and combining the ARP priority level and the QCI priority level of the services in the list, and where services having the lowest priority level may be listed first.

Congestion control function 26 sends to pre-emption function 34 an identification associated with the at least one service to pre-empt. Pre-emption function 34 pre-empts the service associated with the service identification. Thus, a congestion level of '2' triggers pre-emption of pre-emptable non-GBR services associated with an ARP priority level value in the range of 10 to 15 and a QCI priority level in the range of 50-255. In this example, GBR services, regardless of their associated ARP priority level value, are not pre-empted. Similarly, non-GBR services with both an ARP priority level value higher than 10, i.e., 1-9, and a QCI priority level higher than 50, i.e., 1-49, are not pre-empted.

In another exemplary embodiment, a congestion level may be '3.' A congestion level of '3' triggers the pre-emption of both GBR and non-GBR services that are pre-emptable and have an ARP priority level value of 7 or below. As such, pre-emptable GBR and non-GBR services with an ARP priority level value in the range of 7-15 are pre-empted. In determining whether the service may be pre-empted, other criteria, such as the QCI priority level of the service, may not be considered. The ARP pre-emption vulnerability flag needs to have a value of 'true' (pre-emptable) for a service to be pre-empted.

In another exemplary embodiment, node 18 may experience a high congestion level, which is represented in exemplary Table 1 as congestion level 'n.' A congestion level of 'n' triggers the pre-emption of all services with an ARP priority level value of 4 or below and a QCI priority level that is not higher than 5, regardless of the resource type associated with the service. As such, services with an ARP priority level value in the range of 4-15 and a QCI priority level in the range of 5-255 are pre-empted.

The present invention can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A method for managing congestion at a network node having a congestion level, the method comprising:
    determining a pre-emption threshold corresponding to the congestion level, the pre-emption threshold including a quality of service class identifier (QCI) priority level threshold;
    determining a service characteristic associated with an existing service of the node, the service characteristic indicative of a priority level of the existing service, the service characteristic including a QCI priority level; and
    when the service characteristic compared with the pre-emption threshold indicates that the priority level of the existing service warrants preemption of the existing service, preempting the existing service.

2. The method of claim 1, further comprising determining that congestion at the network node has reached the congestion level.

3. The method of claim 1, further comprising receiving a request for a new service and wherein pre-empting the existing service frees resources for the new service.

4. The method of claim 1, wherein pre-empting comprises releasing resources associated with the existing service.

5. The method of claim 4, wherein the resources comprise one or more bearers.

6. The method of claim 1, wherein the congestion level is one of a plurality of congestion levels, and the QCI priority level threshold is one of a plurality of QCI priority level thresholds, each of the plurality of QCI priority level thresholds corresponding to a different one of the plurality of congestion levels.

7. The method of claim 1, wherein the pre-emption threshold includes an Allocation and Retention Priority (ARP) priority level threshold and the service characteristic includes an ARP priority level.

8. The method of claim 7, wherein the congestion level is one of a plurality of congestion levels, and the ARP priority level threshold is one of a plurality of ARP priority level thresholds, each of the plurality of ARP priority level thresholds corresponding to a different one of the plurality of congestion levels.

9. The method of claim 1, wherein the pre-emption threshold includes data corresponding to the service characteristic and the service characteristic includes at least one of an ARP priority level, a QCI priority level, a resource type, a service type, and an ARP pre-emption vulnerability value.

10. The method of claim 1, further comprising determining whether the existing service is pre-emptable based on an allocation and retention priority, ARP, pre-emption vulnerability value associated with the existing service.

11. The method of claim 1, wherein the determined preemption threshold decreases when the congestion level increases.

12. The method of claim 1, wherein the determined preemption threshold increases when the congestion level increases.

13. A network node for managing congestion, the network node comprising:
 a memory configured to store a preemption threshold; and
 a processor configured to:
  determine the pre-emption threshold corresponding to a congestion level at the network node, the pre-emption threshold including a quality of service class identifier (QCI) priority level threshold;
  determine a service characteristic associated with an existing service of the node, the service characteristic indicative of a priority level of the existing service, the service characteristic including a QCI priority level; and
  when the service characteristic compared with the preemption threshold indicates that the priority level of the existing service warrants preemption of the existing service, preempt the existing service.

14. The network node of claim 13, wherein the processor is further configured to determine that congestion at the network node has reached the congestion level.

15. The network node of claim 13, wherein the processor is further configured to receive a request for a new service and wherein pre-empting the existing services frees resources for the new service.

16. The network node of claim 13, wherein pre-empting the existing service comprises releasing resources associated with the existing service.

17. The network node of claim 16, wherein the resources comprise one or more bearers.

18. The network node of claim 13, wherein the congestion level is one of a plurality of congestion levels, and the QCI priority level threshold is one of a plurality of QCI priority level thresholds, each of the plurality of QCI priority level thresholds corresponding to a different one of the plurality of congestion levels.

19. The network node of claim 13, wherein the pre-emption threshold includes an ARP priority level threshold and the service characteristic includes an ARP priority level.

20. The network node of claim 19, wherein the congestion level is one of a plurality of congestion levels, and the ARP priority level threshold is one of a plurality of ARP priority level thresholds, each of the plurality of ARP priority level thresholds corresponding to a different one of the plurality of congestion levels.

21. The network node of claim 13, wherein the pre-emption threshold includes data corresponding to the service characteristic and the service characteristic includes at least one of an ARP priority level, a QCI priority level, a resource type, a service type, and an ARP pre-emption vulnerability value.

22. The network node of claim 13, wherein the processor is further configured to determine whether the existing service is pre-emptable based on an ARP pre-emption vulnerability value associated with the existing service.

23. A computer readable non-transitory storage medium storing computer readable instructions that, when executed by a processor, cause the processor to:
 determine a pre-emption threshold corresponding to the congestion level, the pre-emption threshold including a quality of service class identifier (QCI) priority level threshold;
 determine a service characteristic associated with an existing service of the node, the service characteristic indicative of a priority level of the existing service, the service characteristic including a QCI priority level; and
 when the service characteristic compared to the preemption threshold indicates that the priority level of the existing service warrants preemption of the existing service, preempt the existing service.

* * * * *

UNITED STATES PATENT AND TRADEMARK OFFICE
CERTIFICATE OF CORRECTION

PATENT NO. : 9,743,314 B2  
APPLICATION NO. : 14/617151  
DATED : August 22, 2017  
INVENTOR(S) : Paredes Cabrera Page 1 of 1

It is certified that error appears in the above-identified patent and that said Letters Patent is hereby corrected as shown below:

On the Title Page

Item (63) Column 1, below "Related U.S. Application Data", Line 2, delete "2012." and insert -- 2012, now Pat. No. 8,988,997. --, therefor.

In the Specification

In Column 1, Line 9, delete "2012," and insert -- 2012, now Pat. No. 8,988,997, --, therefor.

In Column 4, Line 49, delete "Si" and insert -- S1 --, therefor.

Signed and Sealed this  
Eleventh Day of September, 2018

Andrei Iancu  
*Director of the United States Patent and Trademark Office*